US009687818B2

(12) United States Patent
Siani et al.

(10) Patent No.: US 9,687,818 B2
(45) Date of Patent: Jun. 27, 2017

(54) PREPARATION OF DIESEL OXIDATION CATALYST VIA DEPOSITION OF COLLOIDAL NANOPARTICLES

(71) Applicant: BASF Corporation, Florham Park, NJ (US)

(72) Inventors: Attilio Siani, Hannover (DE); Torsten W. Müller-Stach, Hannover (DE); Torsten Neubauer, Langenhagen (DE); Xinyi Wei, Princeton, NJ (US)

(73) Assignee: BASF Corporation, Florham Park, NJ (US)

( * ) Notice: Subject to any disclaimer, the term of this patent is extended or adjusted under 35 U.S.C. 154(b) by 289 days.

(21) Appl. No.: 14/058,559

(22) Filed: Oct. 21, 2013

(65) Prior Publication Data

US 2014/0044627 A1    Feb. 13, 2014

Related U.S. Application Data

(62) Division of application No. 12/844,287, filed on Jul. 27, 2010, now abandoned.

(Continued)

(51) Int. Cl.
*B01D 53/94* (2006.01)
*B01J 21/00* (2006.01)
(Continued)

(52) U.S. Cl.
CPC ............. *B01J 23/44* (2013.01); *B01D 53/94* (2013.01); *B01D 53/944* (2013.01); *B01J 23/38* (2013.01);
(Continued)

(58) Field of Classification Search
CPC ... B01J 21/00; B01J 21/04; B01J 21/06; B01J 21/08; B01J 21/10; B01J 21/12;
(Continued)

(56) References Cited

U.S. PATENT DOCUMENTS 4,532,228 A    7/1985  Golino et al.
4,536,482 A *  8/1985  Carcia ...................... B01J 23/36
                                                204/192.15
(Continued)

FOREIGN PATENT DOCUMENTS

CN    101069850    11/2007
EP    0 457 480    11/1991
(Continued)

OTHER PUBLICATIONS

Partial translation of CN-101069850.
(Continued)

*Primary Examiner* — Cam N. Nguyen
(74) *Attorney, Agent, or Firm* — Womble Carlyle Sandridge & Rice, LLP

(57) ABSTRACT

The present invention relates to a process for preparing a catalyst, at least comprising the steps of adding a protecting agent to an aqueous solution of a metal precursor to give a mixture (M1), adding a reducing agent to mixture (M1) to give a mixture (M2), adding a support material to mixture (M2) to give a mixture (M3), adjusting the pH of mixture (M3), and separating the solid and liquid phase of mixture (M3). Furthermore, the present invention relates to the catalyst as such and its use as diesel oxidation catalyst.

20 Claims, 6 Drawing Sheets

Related U.S. Application Data

Figure 1:
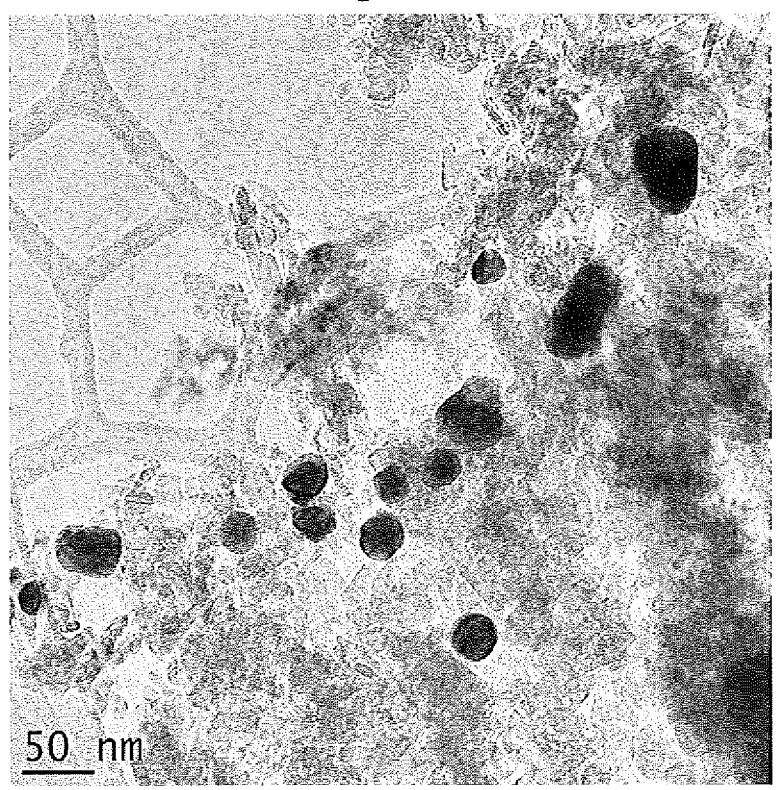
Figure 1:
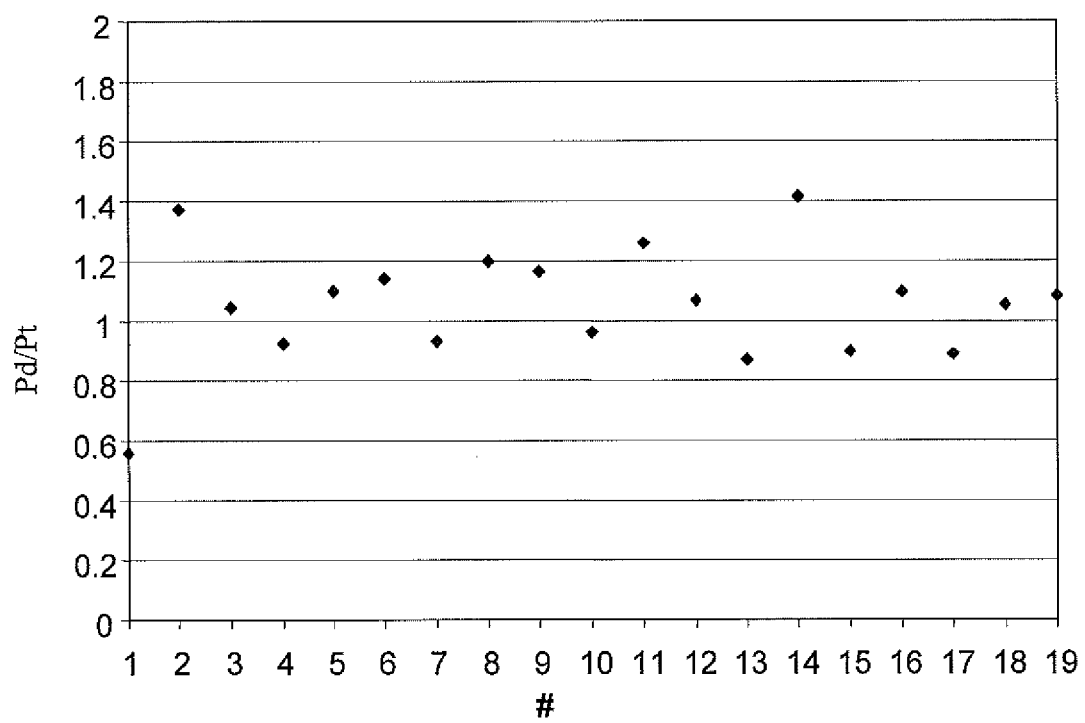

(60) Provisional application No. 61/231,427, filed on Aug. 5, 2009.

(51) Int. Cl.

| | | |
|---|---|---|
| *B01J 21/04* | (2006.01) | |
| *B01J 23/00* | (2006.01) | |
| *B01J 23/02* | (2006.01) | |
| *B01J 23/08* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 23/58* | (2006.01) | |
| *B01J 20/00* | (2006.01) | |
| *B01J 23/38* | (2006.01) | |
| *B01J 23/48* | (2006.01) | |
| *B01J 37/02* | (2006.01) | |
| *B01J 37/04* | (2006.01) | |
| *B01J 37/16* | (2006.01) | |
| *B01J 35/00* | (2006.01) | |

(52) U.S. Cl.
CPC .............. *B01J 23/42* (2013.01); *B01J 23/48* (2013.01); *B01J 35/002* (2013.01); *B01J 35/006* (2013.01); *B01J 37/0203* (2013.01); *B01J 37/04* (2013.01); *B01J 37/16* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01J 21/04* (2013.01); *B01J 35/0013* (2013.01)

(58) Field of Classification Search
CPC ... B01J 21/14; B01J 23/00; B01J 23/38; B01J 23/42; B01J 23/44; B01J 23/46; B01J 23/48; B01J 23/50; B01J 23/52; B01J 23/58; B01J 23/63; B01J 23/66; B01D 53/945
USPC ........ 502/261–263, 304, 327, 328, 332–334, 502/339, 349–351, 355, 415, 439; 977/773, 775; 423/213.5
See application file for complete search history.

(56) References Cited

U.S. PATENT DOCUMENTS

| | | | |
|---|---|---|---|
| 5,208,207 A * | 5/1993 | Stonehart ................ | B01J 23/462 429/525 |
| 5,439,865 A * | 8/1995 | Abe ...................... | B01D 53/945 502/302 |
| 5,897,846 A | 4/1999 | Kharas et al. | |
| 6,030,921 A * | 2/2000 | Ziemer .................... | B01J 23/42 148/430 |
| 6,440,378 B1 | 8/2002 | Hirata et al. | |
| 7,166,555 B2 | 1/2007 | Shustack et al. | |
| 7,229,597 B2 | 6/2007 | Patchett et al. | |
| 7,381,683 B1 * | 6/2008 | Wang .................... | B01D 53/864 502/326 |
| 7,390,770 B2 | 6/2008 | Nochi et al. | |
| 7,431,749 B2 | 10/2008 | Kim et al. | |
| 7,550,117 B2 | 6/2009 | Alward et al. | |
| 7,572,416 B2 | 8/2009 | Alward et al. | |
| 7,601,662 B2 | 10/2009 | Bull et al. | |
| 7,601,670 B2 | 10/2009 | Yasuda et al. | |
| 7,605,109 B1 * | 10/2009 | Jia ........................ | B01D 53/9459 502/303 |
| 7,611,680 B2 * | 11/2009 | Jia ........................ | B01D 53/944 422/170 |
| 7,673,448 B2 | 3/2010 | Voss et al. | |
| 7,709,407 B1 * | 5/2010 | Hao ....................... | B01D 53/944 502/232 |
| 7,709,414 B2 * | 5/2010 | Fujdala ................ | B01D 53/945 422/170 |
| 7,722,829 B2 | 5/2010 | Punke et al. | |
| 7,745,367 B2 * | 6/2010 | Fujdala ................ | B01D 53/945 427/419.3 |
| 2005/0031514 A1 | 2/2005 | Patchett et al. | |
| 2005/0042151 A1 | 2/2005 | Alward et al. | |
| 2005/0121044 A1 * | 6/2005 | Banerjee .............. | A24B 15/165 131/334 |
| 2006/0165910 A1 * | 7/2006 | Kodas ..................... | B01J 23/42 427/446 |
| 2006/0188416 A1 | 8/2006 | Alward et al. | |
| 2007/0014710 A1 * | 1/2007 | Gerlach ................ | B01D 53/945 423/213.5 |
| 2007/0041881 A1 | 2/2007 | Voss et al. | |
| 2007/0104623 A1 | 5/2007 | Dettling et al. | |
| 2007/0160899 A1 * | 7/2007 | Atanassova ......... | H01M 4/8807 429/413 |
| 2008/0045405 A1 | 2/2008 | Beutel et al. | |
| 2008/0127638 A1 | 6/2008 | Vaarkamp et al. | |
| 2008/0132405 A1 | 6/2008 | Patchett et al. | |
| 2008/0141661 A1 | 6/2008 | Voss et al. | |
| 2008/0171650 A1 | 7/2008 | Alward et al. | |
| 2008/0187477 A1 | 8/2008 | Nochi et al. | |
| 2008/0268159 A1 | 10/2008 | Hirata | |
| 2009/0011177 A1 | 1/2009 | Kubo et al. | |
| 2009/0155134 A1 | 6/2009 | Li | |
| 2009/0255241 A1 | 10/2009 | Patchett et al. | |
| 2009/0257933 A1 | 10/2009 | Chen et al. | |
| 2009/0274602 A1 | 11/2009 | Alward et al. | |
| 2010/0124523 A1 | 5/2010 | Chen et al. | |
| 2010/0263358 A1 | 10/2010 | Chen et al. | |
| 2011/0034331 A1 * | 2/2011 | Kikuchi ................ | B01D 53/945 502/303 |

FOREIGN PATENT DOCUMENTS

| | | |
|---|---|---|
| EP | 1 611 952 | 1/2006 |
| EP | 1 886 726 | 2/2008 |
| EP | 2 452 750 | 5/2012 |
| JP | H02-141508 | 5/1990 |
| JP | H07-100380 | 4/1995 |
| JP | 2003-181288 | 7/2003 |
| JP | 2003-299957 | 10/2003 |
| JP | 2005-052718 | 3/2005 |
| JP | 2005-262162 | 9/2005 |
| JP | 2008-049336 | 3/2008 |
| JP | 2008-529775 | 8/2008 |
| KR | 10-2004-00894 68 | 10/2004 |
| WO | WO-95/32790 | 12/1995 |
| WO | WO 98/32956 | 7/1998 |
| WO | WO-2004/089508 | 10/2004 |
| WO | WO 2005/063390 | 7/2005 |
| WO | WO-2009/020957 | 2/2009 |
| WO | WO-2009/079557 | 6/2009 |
| WO | WO-2010/083313 | 7/2010 |
| WO | WO-2010/083315 | 7/2010 |
| WO | WO-2010/083357 | 7/2010 |
| WO | WO-2010/114873 | 10/2010 |

OTHER PUBLICATIONS

Burton, Patrick D. et al., "Synthesis and Activity of Heterogeneous Pd/Al2O3 and Pd/ZnO Catalysts Prepared from Colloidal Palladium Nanoparticles", *Top. Catal.* 49 2008, 227-232 pgs.

Torigoe, Esumi et al., "Chemical Industry", 1996, 269-277 pgs.

Wang, Yuan et al., "Immobilization of Polymer-protected Metal Colloid Catalysts by the Formation of Polymer Hydrogen Bond Complexes", *Polymers for Advanced Technologies*, vol. 7 1996, 634-638 pgs.

* cited by examiner

PREPARATION OF DIESEL OXIDATION CATALYST VIA DEPOSITION OF COLLOIDAL NANOPARTICLES

CROSS REFERENCE TO RELATED APPLICATION

This application is a divisional of U.S. application Ser. No. 12/844,287, filed on Jul. 27, 2010, which claims priority to U.S. provisional patent application No. 61/231,427, filed on Aug. 5, 2009, all of which are incorporated herein by reference in their entireties.

FIELD OF THE INVENTION

This invention relates to a production method of a precious metal catalyst. Furthermore, the present invention relates to the catalyst as such and its use as diesel oxidation catalyst.

BACKGROUND OF THE INVENTION

Exhaust gas emitted from an internal combustion engine such as an automobile engine contains carbon monoxide (CO), hydrocarbons (HC), nitrogen oxides (NOx), and so forth. These detrimental substances are generally purified by an exhaust gas purification catalyst in which a catalyst component mainly consisting of a precious metal such as platinum (Pt), rhodium (Rh), palladium (Pd), iridium (Ir), etc., is supported by an oxide support such as alumina.

To support the precious metal of the catalyst component on the oxide support, a method is generally used which involves the steps of using a solution of a precious metal compound optionally modified, allowing the oxide support to be impregnated with this solution so as to disperse the precious metal compound on the surface of the oxide support, and baking the oxide support. Materials having a high specific surface area such as gamma-alumina are generally employed for the oxide support to give a large contact area with the catalyst component to the exhaust gas.

It is known that the performance of supported metal catalysts depends on the structure and composition of the metal nanoparticles they contain, and the nature of the support.

Though simple, conventional impregnation methods used for the preparation of supported catalysts often provide limited control over the structure of the resulting materials (i.e. average particle size, particle composition and location of the active components).

In order to overcome such disadvantages, published literature describes the use of alternative synthetic routes such as the use of organometallic molecular carbonyl cluster precursors as well as methods involving the use of templating agents (e.g. surfactants and polymers). The potential advantages of using metal carbonyl clusters as precious metal source for catalytic applications lay in the high metal dispersions and homogeneity in particle size composition due to the relatively low temperature of the activation procedure and, when using heterometallic cluster precursors, to the preformed heterometallic bonds. However, the limited stability of such clusters on the surfaces of various supports, as well as difficulties in their synthesis and handling makes the use of cluster-derived catalysts problematic for large-scale applications.

On the other side, synthetic routes based on the use of templating agents offer the possibility to prepare colloidal metal nanoparticles with controlled particle size and composition. The synthetic steps for the preparation of supported metal catalysts through colloidal routes commonly involve the interaction between the metal precursors and the protective agent followed by a reduction treatment leading to the formation of a metal colloidal suspension. Such metal suspension can be then deposited onto the support surface and finally the protective agent removed to expose the nanoparticles to the reactants.

Few examples are reported in the literature describing the use of polymer-stabilized precious metal colloids as precursors for the preparation of supported metal catalysts where improved metal dispersions with respect to conventional methods are achieved.

Liu et al. (Polym. Adv. Technol. 1996, 7, 634) describe the deposition of Poly vinylpyrrolidone—(PVP) and polyvinyl-alcohol—(PVA) protected Pt and Pd nanoparticles on $SiO_2$ surface. However, such surface needed to be pretreated by pre-adsorption of poly acrylic acid to ensure deposition of the polymer-capped nanoparticles.

Pd colloidal suspensions were prepared by Burton et al. (Top. Catal. 2008, 49, 227-232) by heating up to 300° C. a suitable Pd precursor in a triclyphosphine or in an octylamine solution. The obtained particle were then washed with hexane and deposited onto an oxidic support followed by calcination of support in order to remove the capping agent.

Higher purification performance of the exhaust gas has been further required for such an exhaust gas purification catalyst for the environmental protection. Control of the cluster size of the precious metal to an optimal size is one way. According to the supporting method of the precious metal of the prior art which uses a solution of the precious metal compound, the precious metal is adsorbed on the oxide support at an atomic level in which the precious metal compound is dispersed to the surface of the oxide support, but the atoms of the precious metal move and invite grain growth in the baking process in which the precious metal is firmly supported. It has therefore been extremely difficult to support only the precious metal of a desired cluster size on the oxide support.

Japanese Unexamined Patent Publication (Kokai) No. 2003-181288 proposes a method for supporting a precious metal on an oxide support by introducing the precious metal into pores of a hollow carbon material such as a carbon nano-horn or a carbon nano-tube so that the precious metal forms a cluster having a desired size, instead of directly supporting the precious metal on the oxide support, fixing the precious metal to the carbon material, then baking them together and thereafter burning and removing the carbon material and at the same time, supporting the precious metal on the oxide support.

According to such a method, the precious metal exists inside the pores of the carbon material until the carbon material is burnt and removed, and when the carbon material is burnt and removed, the precious metal is quickly supported on the oxide support. Therefore, the precious metal can be substantially supported by the oxide support at a cluster size inside the pores of the carbon material. However, this method is not free from problems in which the precious metal must be introduced into the pores of the hollow carbon material, which results in low productivity.

Torigoe, Esumi et al. proposes in "Chemical Industry", pp. 276-296 (1998) to produce precious metal particles having particle sizes in the order of nm by reducing a mixed solution of a polymer compound such as polyvinyl pyrrolidone and precious metal ions by using a reducing agent such as $H_2$, $NaBH_4$, $C_2H_5OH$, or the like.

However, when a compound is used as the reducing agent in the method described above, there is a problem that an element or elements are contained in the compound mix as impurities in the final precious metal particles. When NaBH$_4$ is used as the reducing agent, for example, Na and B mix. When an alcohol is used as the reducing agent, not only the alcohol, but also ketones, aldehydes, carboxylic acids, etc., formed while the alcohol is oxidised during the reduction of the metal ions, may mix. When hydrogen is used as the reducing agent, problems occur in that the particle diameter of the resulting precious metal particles becomes large and the particles are odd-shaped.

WO 2004/089508 provides a method of preparing an oxidation catalyst for oxidizing volatile organic fraction and a catalyzed wall-flow filter for use in removing soot particulates from diesel engine exhaust, including preparing a PGM salt and a transition/alkali metal salt with a water-soluble polymer compound and a reducing agent, to obtain a first colloidal solution, which is then washcoated to a catalyst-support-coated monolithic ceramic substrate, followed by calcination process at high temperatures, to obtain an oxidation catalyst; and treating a PGM salt and a metal salt mixture including at least one selected from a first group of catalyst metal to increase oxidation activity for nitrogen monoxide (NO) and at least one selected from a second group of catalyst metal to decrease a combustion temperature of soot particulates by oxidizing agents, such as nitrogen dioxide and oxygen, with a water-soluble polymer compound and a reducing agent, to obtain a second colloidal solution, which is then washcoated on a catalyst-support-coated wall-flow filter, followed by calcination process at high temperatures, to obtain a catalyzed wall-flow filter.

WO 95/32790 relates generally to the control of hydrocarbons, carbon monoxide, and nitrogen oxides in the exhaust of internal combustion engines. More particularly, the invention relates to the removal of NO when the exhaust gases include oxygen substantially in excess of that needed for combustion of the fuel. This is for example the case with lean burn engines, diesel engines, and other engines currently under development.

US 2008/0268159 relates to a production method of a precious metal catalyst. More specifically, the present invention relates to a production method of a precious metal catalyst the cluster size of which is controlled. US 2008/0628159 provides a production method of a precious metal catalyst including the steps of uniformly mixing a solution containing a precious metal and an aqueous solution of a polymer compound capable of coordination with the precious metal to form a complex of the precious metal and the polymer compound, adding the drop-wise aqueous solution containing the complex to water containing micro-bubbles containing therein hydrogen, mixing the solutions to reduce the precious metal, supporting the mixed solution on a support and baking the solution.

The processes known from the state of the art have several disadvantages, like for example the use of several steps procedures to obtain the final catalyst, limited control over the colloidal nanoparticles location upon impregnation on a support-coated wall-flow filter, the use of high temperature treatment for the formation of the colloidal suspension or the use of a H$_2$ micro-bubble generator, which have limited life time in solution. These disadvantages limit the applicability of the method and the productivity.

The present invention provides a process for preparing a catalyst avoiding the disadvantages of the processes known from the state of the art.

SUMMARY OF THE INVENTION

The present invention is directed to a process for preparing a catalyst. In particular, the present invention is directed to a process for preparing a catalyst, at least comprising the steps:
(1) adding a protecting agent to an aqueous solution of a metal precursor to give a mixture (M1),
(2) adding a reducing agent to mixture (M1) to give a mixture (M2),
(3) adding a support material to mixture (M2) to give a mixture (M3),
(4) adjusting the pH of mixture (M3),
(5) separating the solid and liquid phase of mixture (M3).

According to a further aspect, the present invention is directed to a catalyst obtainable by a process according to the present invention.

Furthermore, the present invention is directed to the use of a catalyst obtainable by a process according to the present invention or of a catalyst the present invention as diesel oxidation catalyst.

DETAILED DESCRIPTION OF THE INVENTION

The present invention is directed to a process for preparing a catalyst. In particular, the present invention is directed to a process for preparing a catalyst, at least comprising the steps:
(1) adding a protecting agent to an aqueous solution of a metal precursor to give a mixture (M1),
(2) adding a reducing agent to mixture (M1) to give a mixture (M2),
(3) adding a support material to mixture (M2) to give a mixture (M3),
(4) adjusting the pH of mixture (M3),
(5) separating the solid and liquid phase of mixture (M3).

According to the process of the present invention, a catalyst is obtained which contains highly dispersed metal particles on a support material.

The present invention improves the state of the art described above by reducing the number of preparations steps. This results in an improved process and reduced costs.

Furthermore, the process according to the present invention can be carried out without inert atmosphere, thus eliminating the need of purge gasses or inert atmospheres upon dissolution and interaction of the metal salt precursor with the protective agent.

Using the process of the present invention, it is possible to obtain deposition of the metal nanocomposites onto the surface of the support by simplified control over the physico-chemical properties (i.e. pH) of the metal colloidal solutions used as precursor.

The use of additional polymers and or solvents to the aqueous solution to obtain a more homogeneous metal dispersion and metal nanoparticle composition with respect to conventional methods can be avoided.

Finally, the need of multiple metal/protective agent interactions steps and/or reductions steps to form highly dispersed Pt/Pd nanoparticles with homogeneous composition are eliminated according to the present invention. According to the present invention the composition of the resulting Pt/Pd particles is controlled by the relative Pt/Pd amount used in the preparation.

The catalysts obtained by the process according to the present invention show improved catalytic activity of the resulting materials even after hydrothermal treating at 800° C. for 12 h.

The process according to the present invention comprises steps (1) to (5). According to step (1), a protecting agent is added to an aqueous solution of a metal precursor to give a mixture (M1).

As a metal precursor, any suitable compound can be added which is soluble in water, i.e. which is suitable to prepare an aqueous solution of the metal precursor. Suitable compounds are for example metal salts. Preferably, a suitable compound of a metal selected from the group consisting of platinum, palladium, rhodium, gold and silver or mixtures thereof is used. For example metal salts of platinum, palladium, rhodium, gold and silver or mixtures thereof are used in the process of the present invention. In particular, the metal is palladium or platinum.

According to one embodiment, the present invention is therefore directed to a process for preparing a catalyst as disclosed above, wherein the metal precursor is selected from metal salt of platinum, palladium, rhodium, gold and silver or mixtures thereof.

An aqueous solution of the metal precursor is used in step (1). According to the present invention, the concentration of the metal in the aqueous solution of the metal precursor is preferably in the range of from $1*10^{-6}$ to $4.6*10^{-5}$ mol metal per mol solution, more preferably in the range of from $5*10^{-6}$ to $4.3*10^{-5}$ mol metal per mol solution, more preferably in the range of from $1*10^{-5}$ to $3.9*10^{-5}$ mol metal per mol solution, more preferably in the range of from $1.8*10^{-5}$ to $3.6*10^{-5}$ mol metal per solution.

As a protecting agent, any suitable compound can be used in the context of the present invention. Suitable protecting agents are for example soluble homo- and co-polymers having one or more amino, amido, carboxylic, aldehydic, or hydroxyl groups, and organic molecules having one or more amino, amido, carboxylic, aldehydic, or hydroxyl groups and mixtures thereof.

According to a further embodiment, the present invention is therefore directed to a process for preparing a catalyst as disclosed above, wherein the protecting agent is selected from soluble homo- and co-polymers having one or more amino, amido, carboxylic, aldehydic, or hydroxyl groups, and organic molecules having one or more amino, amido, carboxylic, aldehydic, or hydroxyl groups and mixtures thereof.

Preferred protecting agents are for example selected from poly(vinylalcohol), poly(vinylpyrrolidone), poly(ethyleneimine), poly(acrylic acid), carbohydrates or alkali metal citrates. Therefore, according to a preferred embodiment, the present invention is therefore directed to a process for preparing a catalyst as disclosed above, wherein the protecting agent is selected from poly(vinylalcohol), poly(vinylpyrrolidone), poly(ethyleneimine), poly(acrylic acid), carbohydrates or alkali metal citrates.

According to the present invention, suitable ratios between the metal precursor and the protective agent are in the range of from 1:1 to 1:10 when calculated as ratio between a mol of precious metal and the unit of the protective agent. Preferred ratios between a mol of metal precursor and a unit of protective agent are in the range of from 1:2 to 1:4.

Preferably, the reaction is carried out at ambient pressure at a temperature of from 15 to 35° C., more preferably at a temperature of from 20 to 30° C., more preferably at room temperature. It is preferred to carry out the reaction under stirring. According to the present invention, mixtures are obtained by preferably mixing two or more solutions comprising the same or different precious metal components. However, it is also possible that preformed mixtures are used.

In step (1) of the process according to the present invention, mixture (M1) is obtained. According to step (2), a reducing agent is added to mixture (M1) to give a mixture (M2).

In principle, any suitable reducing agent can be used in the process according to the present invention. Preferably, the reducing agent is selected from alkali metal borohydrides, hydrazine, formaldehyde, alkali metal citrates, amino borane complexes, gaseous hydrogen and carbon monoxide.

Therefore, according to a further embodiment, the present invention is therefore directed to a process for preparing a catalyst as disclosed above, wherein the reducing agent is selected from alkali metal borohydrides, hydrazine, formaldehyde, alkali metal citrates, amino borane complexes, gaseous hydrogen and carbon monoxide.

Suitable ratios between the metal precursor and the reducing agent are in the range of from 1:1 to 1:20 when calculated as ratio between a mol of precious metal and a mol of the reducing agent. Preferred ratios between a mol of metal precursor and a mol of reducing agent are in the range of from 1:2 to 1.8. Depending from the reducing agent the reaction can be carried out at room temperature under stirring.

Mixtures thus obtained could be also constituted by mixing two or more (M2) mixtures comprising the same or different precious metal components. Such solutions could be obtained also by mixing two or more (M1) solutions, which are obtained in step (1) by addition of the same or different protective agent, followed by addition of the same or different reducing agent. Additionally, mixture (M2) can be obtained by mixing one or more mixtures (M2) with one ore more mixtures (M1) followed by addition of a reducing agent.

In step (2), the mixture (M2) is obtained. To this mixture, a support material is added to give a mixture (M3).

In principle, any suitable support material can be used in the process according to the present invention. Preferred support materials are for example aluminum oxide, silicon oxide, cerium oxide, zirconium oxide, titanium oxide, magnesium oxide alone or as mixtures and/or solid solutions from these support materials.

According to a further embodiment, the present invention is therefore directed to a process for preparing a catalyst as disclosed above, wherein the support material is selected from aluminum oxide, silicon oxide, cerium oxide, zirconium oxide, titanium oxide, magnesium oxide alone or as mixtures and/or solid solutions from these support materials.

Suitable amounts of the support material are chosen to have a final precious metal concentration on the support in the range of from 0.01% to 10% wt/wt with respect to the resulting material. Preferred concentrations of the precious metal on the support material are in the range of from 0.1% to 5% wt/wt with respect to the support material.

According to the present invention, the support material is added to the mixture at room temperature while the mixture is stirring.

According to step (4) of the process of the present invention, the pH of mixture (M3) obtained in step (3) of the process of the present invention is adjusted. The pH is preferably adjusted to a value in the range from 2 to 7. Thus, according to a further embodiment, the present invention is directed to a process for preparing a catalyst as disclosed above, wherein in step (4) the pH is adjusted to a value in the range from 2 to 7.

According to the present invention, the pH can be adjusted by any suitable method for example by addition of a suitable acid, in particular a mineral acid like HCl or $HNO_3$.

According to the present invention, the pH adjustment is preferably carried out at room temperature while the solution is stirred.

In step (5) of the process of the present invention, the solid and liquid phases of mixture (M3) are separated. Separation can be achieved by any suitable method, for example filtration or centrifugation or evaporation of the solvent. According to a further embodiment, the present invention is therefore directed to a process for preparing a catalyst as disclosed above, wherein in step (5) the solid and liquid phase of mixture (M3) are separated by filtration or evaporation of the solvent.

The process according to the present invention can also comprise additional steps, for example heating or cooling steps or steps for altering the concentration of any of the mixtures obtained in the process of the present invention. The additional steps can be carried out before or after steps (1) to (5) or between any of the steps (1), (2), (3), (4), and/or (5) of the process of the present invention.

According to the process of the present invention, a catalyst is obtained which has highly dispersed nanoparticles with homogeneous composition.

The catalysts obtained by the process according to the present invention show improved catalytic activity of the resulting materials even after hydrothermal treating at 800° C. for 12 h.

Therefore, according to a further aspect, the present invention is directed to a catalyst obtainable and/or obtained by a process as disclosed above.

The catalyst according to the present invention comprises a support material and highly dispersed metal nanoparticles.

Preferably, the support material is selected from preferred support materials as mentioned above, for example aluminum oxide, silicon oxide, cerium oxide, zirconium oxide, titanium oxide, magnesium oxide alone or as mixtures and/or solid solutions from these support materials.

The metal is preferably selected from platinum, palladium, rhodium, gold and silver or mixtures thereof, more preferred platinum and palladium or mixtures thereof.

The catalysts according to the present invention have improved properties. For example for a catalyst comprising only platinum as metal, after treatment of the catalyst at 450° C. for a desired period of time in an oxidizing atmosphere (air), no less than 65% of the metal particles have an average diameter below 3 nm. Also for a catalyst comprising only platinum as metal, after treatment of the obtained catalyst at 800° C. for 12 h in an oxidizing atmosphere (10% $H_2O$ in air), no less than 22% of the metal particles have an average diameter below 22 nm.

For a catalyst comprising platinum and palladium as metals, after treatment of the obtained catalyst at 800° C. for 12 h in an oxidizing atmosphere (10% $H_2O$ in air), no less than 36% of the metal particles have an average diameter below 22 nm. Furthermore, for a catalyst comprising platinum and palladium as metals, after treatment of the obtained catalyst at 800° C. for 12 h in an oxidizing atmosphere (10% $H_2O$ in air), no less than 90% of the metal particles are constituted by both Pt and Pd.

The catalysts obtained according to the process according to the present invention or the catalysts according to the present invention are in particular suitable as diesel oxidation catalysts, in particular due to the improved thermal resistance and reduced metal particle grain growth during hydrothermal aging conditions simulating the lean aging conditions typically encountered during the operation of a diesel engine. Therefore, according to a further aspect, the present invention is directed to the use of a catalyst obtainable and/or obtained by a process according to the present invention as diesel oxidation catalyst. Also, the present invention relates to a process for oxidizing diesel exhaust wherein the diesel exhaust is brought into contact with a catalyst obtainable and/or obtained by a process according to the present invention.

Such catalyzed soot filter of the present invention can be used in an integrated emission treatment system, in particular in an exhaust conduit comprising one or more additional components for the treatment of diesel exhaust emissions. For example, such exhaust conduit which is most preferably in fluid communication with the diesel engine may comprise a catalyzed soot filter according to the present invention and may further comprise a diesel oxidation catalyst (DOC) article and/or a selective catalytic reduction (SCR) article and/or an NOx storage and reduction (NSR) catalytic article. Most preferably, the DOC article and/or the SCR article and/or the NSR article are in fluid communication with the catalyzed soot filter. The diesel oxidation catalyst can be located upstream or downstream from the catalyzed soot filter and/or selective catalytic reduction component. More preferably, the catalyzed soot filter of the present invention is located downstream from the DOC article. Still more preferably the catalyzed soot filter of the present invention is located either upstream or downstream of the SCR article.

Even more preferably, downstream the inventive catalyzed soot filter, there is no NOx reduction catalytic article comprised in the system, preferably no NOx storage and reduction (NSR) catalytic article.

A suitable SCR article for use in the exhaust conduit is typically able to catalyze the reaction of $O_2$ with any excess $NH_3$ to $N_2$ and $H_2O$, so that $NH_3$ is not emitted to the atmosphere. Useful SCR catalyst compositions used in the exhaust conduit should also have thermal resistance to temperatures greater than 650° C. Such high temperatures may be encountered during regeneration of the upstream catalyzed soot filter. Suitable SCR articles are described, for instance, in U.S. Pat. No. 4,961,917 and U.S. Pat. No. 5,516,497. Suitable SCR articles include one or both of an iron and a copper promoter typically present in a zeolite in an amount of from about 0.1 to 30 percent by weight, preferably from about 1 to 5 percent by weight, of the total weight of promoter plus zeolite. Typical zeoites may exhibit a CHA framework structure.

The inventive catalyzed soot filter can be arranged downstream of the DOC. In such an arrangement, the inventive catalyzed soot filter provides the advantage that HC and CO are reduced during soot combustion which is most preferably achieved by the upstream zone of the inventive filter. Further, the specific design of the rear zone ensures that in the downstream zone of the catalyzed soot filter, as low an amount of NOx as possible is generated. Thus, downstream such DOC, the inventive catalyzed soot filter can be very advantageous in its clean-up function for the treatment of diesel exhaust.

Also, the present invention relates to the catalyzed soot filter as defined above for use in a method of treating a diesel engine exhaust stream, the exhaust stream containing soot particles, said method comprising contacting the exhaust stream with the catalyzed soot filter, preferably after having directed the exhaust stream through a diesel oxidation catalyst (DOC), said DOC preferably comprising a flow through substrate or a wall flow substrate. Similarly, the present invention relates to the use of the catalyzed soot filter as defined above for treating a diesel engine exhaust stream, the exhaust stream containing soot particles, wherein the exhaust stream is contacted with the catalyzed soot filter, preferably after having directed the exhaust stream through a diesel oxidation catalyst (DOC), said DOC preferably comprising a flow through substrate or a wall flow substrate.

Further, the present invention relates to a system for treating for treating a diesel engine exhaust stream, the system comprising an exhaust conduit in fluid communication with the diesel engine via an exhaust manifold;
a catalyzed soot filter as defined above; and
one or more of the following in fluid communication with the catalyzed soot filter: a diesel oxidation catalyst (DOC), a selective catalytic reduction (SCR) article, an NOx storage and reduction (NSR) catalytic article.

Preferably, in this system, the catalyzed soot filter is arranged downstream of the DOC. More preferably, the system does not contain an NOx reduction catalytic article, and more preferably, the system does not contain an NOx storage and reduction (NSR) catalytic article.

Therefore, the present invention also relates to a method of treating a diesel engine exhaust stream, the exhaust stream containing soot particles, said method comprising contacting the exhaust stream with a catalyzed soot filter as defined above, preferably after having directed the exhaust stream through a diesel oxidation catalyst (DOC), said DOC preferably comprising a flow through substrate or a wall flow substrate.

According to an optional embodiment of the present invention, this method further comprises directing the exhaust stream resulting from the DOC or from the catalyzed soot filter through a selective catalytic reduction (SCR) article.

In particular, the present invention is characterized by the following embodiments, including the specific combinations of individual embodiments given by the respective back-references:

1. A process for preparing a catalyst, at least comprising the steps:
   (1) adding a protecting agent to an aqueous solution of a metal precursor to give a mixture (M1),
   (2) adding a reducing agent to mixture (M1) to give a mixture (M2),
   (3) adding a support material to mixture (M2) to give a mixture (M3),
   (4) adjusting the pH of mixture (M3),
   (5) separating the solid and liquid phase of mixture (M3).
2. The process of embodiment 1, wherein the protecting agent is selected from soluble homo- and co-polymers having one or more amino, amido, carboxylic, aldehydic, or hydroxyl groups, and organic molecules having one or more amino, amido, carboxylic, aldehydic, or hydroxyl groups and mixtures thereof.
3. The process of embodiment 1 or 2, wherein the protecting agent is selected from poly(vinylalcohol), poly(vinylpyrrolidone), poly-(ethyleneimine), poly(acrylic acid), carbohydrates or alkali metal citrates.
4. The process of any of embodiments 1 to 3, wherein the metal precursor is selected from metal salt of platinum, palladium, rhodium, gold and silver or mixtures thereof.
5. The process of any of embodiments 1 to 4, wherein the reducing agent is selected from alkali metal borohydrides, hydrazine, formaldehyde, alkali metal citrates, amino borane complexes, gaseous hydrogen and carbon monoxide.
6. The process of any of embodiments 1 to 5, wherein the support material is selected from aluminum oxide, silicon oxide, cerium oxide, zirconium oxide, titanium oxide, magnesium oxide alone or as mixtures and/or solid solutions from these support materials.
7. The process of any of embodiments 1 to 6, wherein in step (4) the pH is adjusted to a value in the range from 2 to 7.
8. The process of any of embodiments 1 to 7, wherein in step (5) the solid and liquid phase of mixture (M3) are separated by filtration or evaporation of the solvent.
9. A catalyst obtainable by a process according to any of embodiments 1 to 8.
10. The catalyst according to embodiment 9, comprising platinum and palladium as metals, wherein after treatment of the catalyst at 800° C. for 12 h in an oxidizing atmosphere (10% $H_2O$ in air), no less than 36% of the metal particles have an average diameter below 22 nm.
11. The catalyst according to embodiment 9 or 10, comprising platinum and palladium as metals, wherein after treatment of the catalyst at 800° C. for 12 h in an oxidizing atmosphere (10% $H_2O$ in air), no less than 90% of the metal particles are constituted by both Pt and Pd.
12. Use of a catalyst according to any of embodiments 9 to 11 as diesel oxidation catalyst.

DETAILED DESCRIPTION OF THE FIGURES

FIG. 1. shows the transmission electron microscope of a Pt/Pd sample on an alumina support prepared following the procedure according to Example 3 below and detailing the particle size composition. The x-axis of the diagram shows the number of particles (#), the y-axis the ratio of Pt/Pd (in mol/mol).

Figure 2:
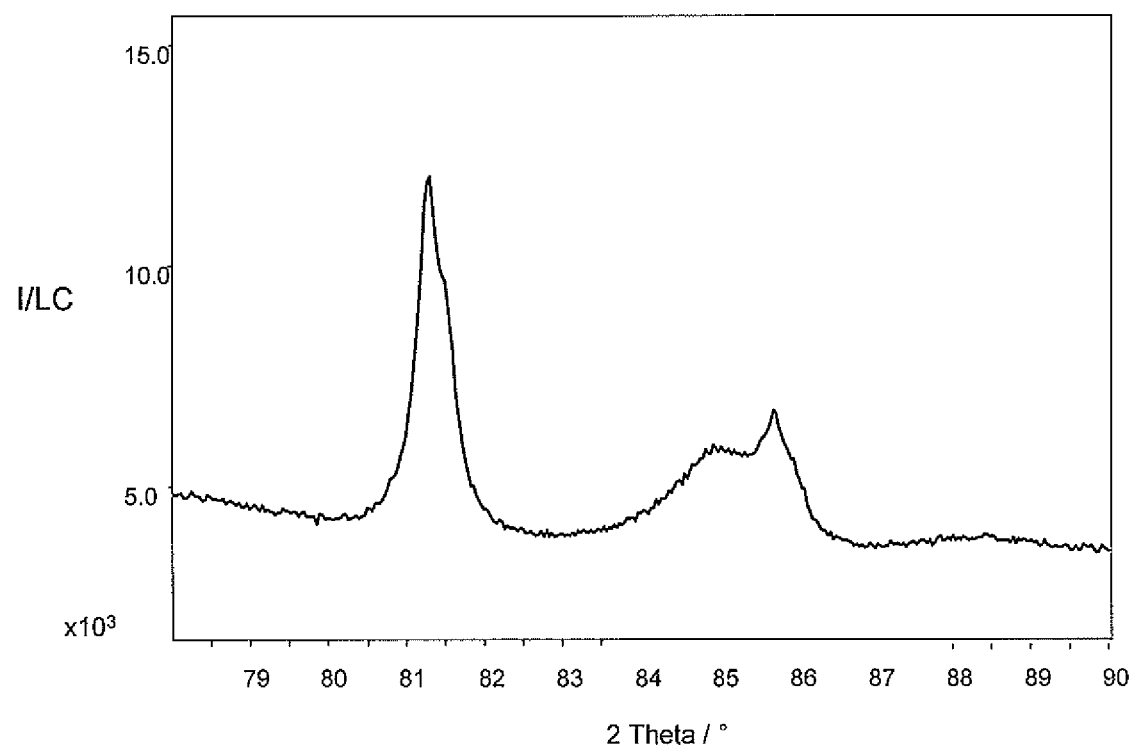

FIG. 2. shows the XRD spectrum of 1% Pt on aluminium oxide prepared according to the process of the invention. The x-axis shows the 2 Theta scale (in °), the y-axis the intensity (in lincounts; I/LC).

Figure 3:
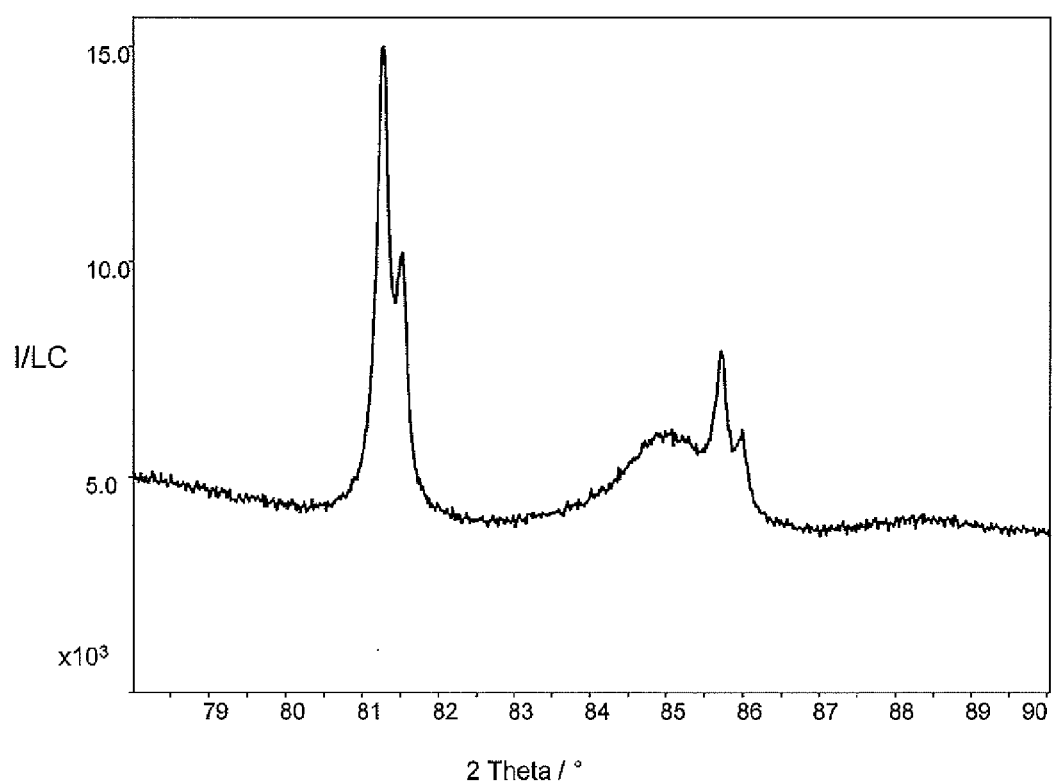

FIG. 3. shows the XRD spectrum of 1% Pt on aluminium oxide prepared according to a process according to the state of the art. The x-axis shows the 2 Theta scale (in °), the y-axis the intensity (in lincounts; I/LC).

Figure 4:
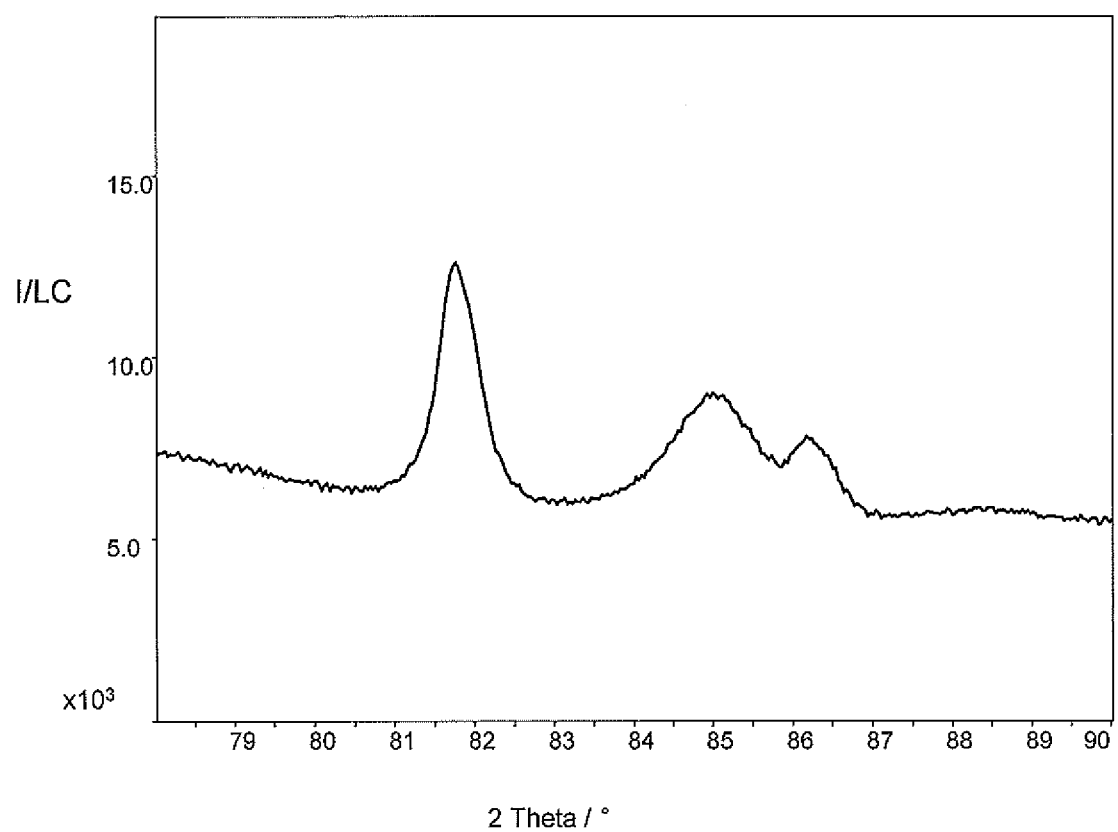

FIG. 4. shows the XRD spectrum of 0.67% and Pt 0.33% Pd on aluminium oxide prepared according to the process of the invention. The x-axis shows the 2 Theta scale (in °), the y-axis the intensity (in lincounts; I/LC).

Figure 5:
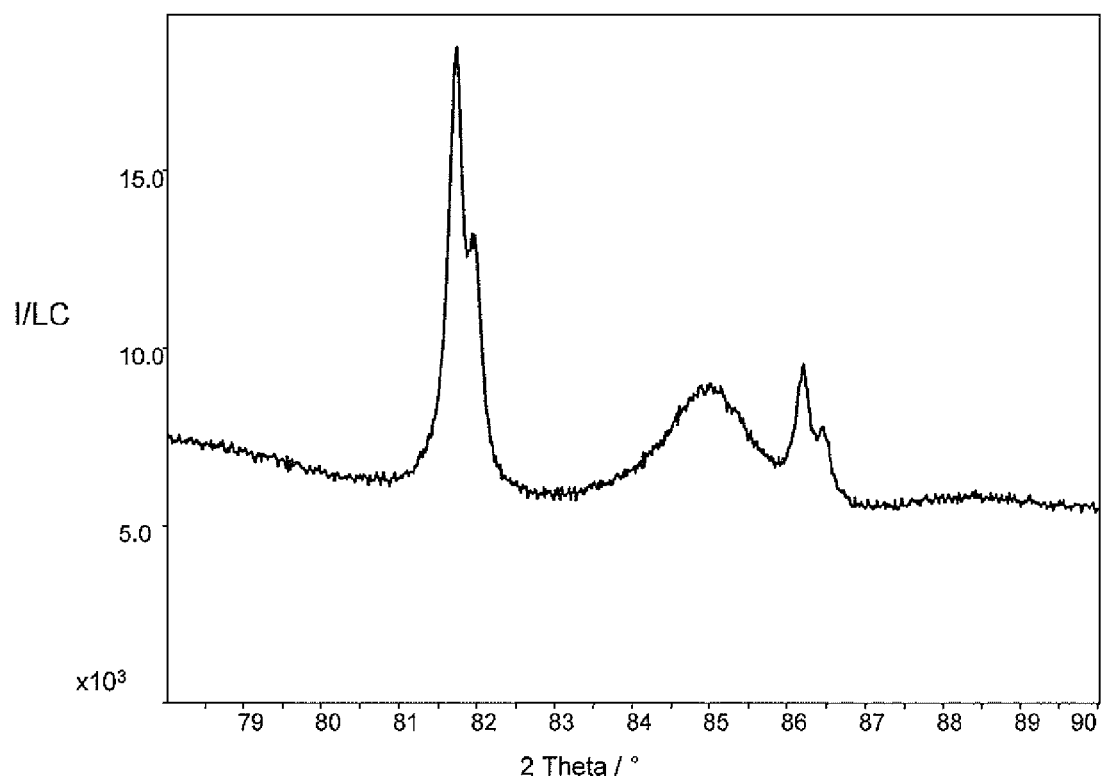

FIG. 5. shows the XRD spectrum of 0.67% Pt and 0.33% Pd on aluminium oxide prepared according to a process according to the state of the art. The x-axis shows the 2 Theta scale (in °), the y-axis the intensity (in lincounts; 1/LC).

Figure 6:
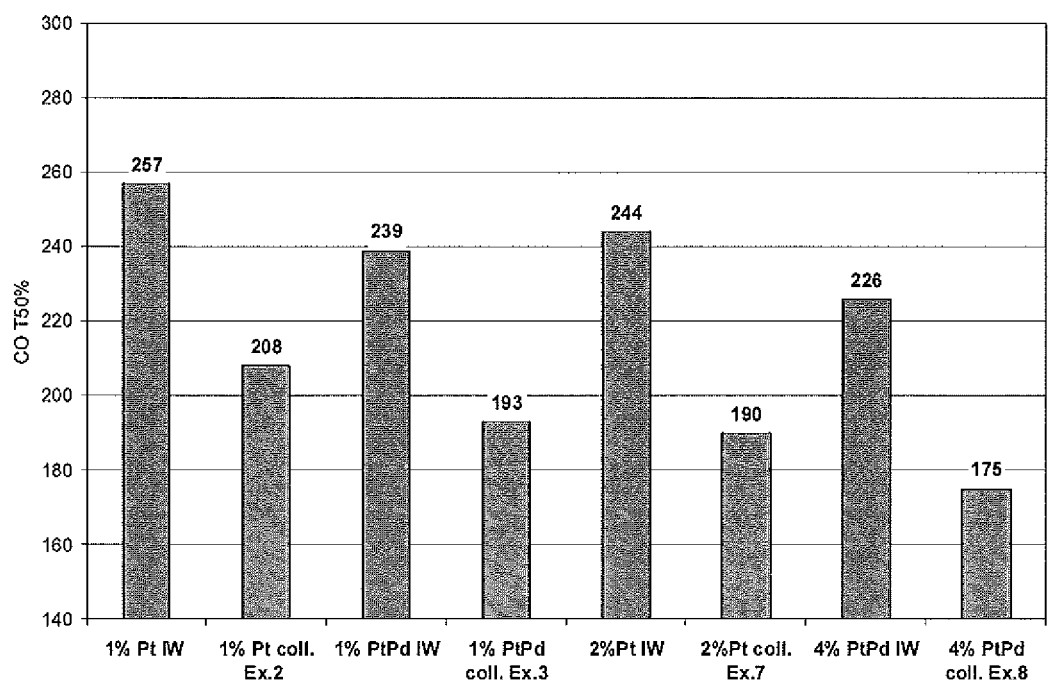

FIG. 6. shows a diagram comparing the gas activity of catalysts prepared according to the process of the invention with that of prior art catalysts. A detailed description of FIG. 6 is to be found in the context of Example 11 herein under.

The present invention is further illustrated by way of the following examples.

EXAMPLES

Example 1

10.2 g of an $H_2PtCl_6$ solution containing $5.1*10^{-2}$ moles of Pt per liter of solution were diluted in 400 ml of water and an opportune amount of a PVP solution containing 10 mg of PVP per ml of solution was added in order to achieve a Pt/PVP weight ratio equal to 1. After letting the solution stir at room temperature in air for 1 hour, NaBH$_4$ was added to the solution at room temperature. The amount of NaBH$_4$ was chosen in order to have a Pt/NaBH$_4$ weight ratio of ½. Following stirring for 1 hour in air of the obtained mixture, an appropriate amount of alumina powder was added to the solution in order to achieve a total metal loading of 1% wt/wt and the pH adjusted to a value of 2.4 with an HCl solution containing 15% HCl in weight. After 30 minutes of stirring the solution was filtered and the solid powder recovered.

Example 2

The same process and quantities of reagents were used as in Example 1 with the exception of the PVP addition. Here an opportune amount of PVP solution containing 10 mg of PVP per mg of solution was added in order to achieve a Pt/PVP weight ratio equal to 2.

Example 3

The same process and quantities of reagents were used as in Example 2 with the exception that 6.6 g of an H$_2$PtCl$_6$ solution containing 5.1*10$^{-2}$ moles of Pt per liter of solution were diluted in 400 ml of water together with 110 mg of K$_2$PdCl$_4$.

As one can see from FIG. 1, the precious metal nanoparticles comprise both platinum and palladium and the composition is the same as one would expect from the relative ratio of platinum and palladium when calculated based on the mol of precious metal.

Example 4

6.6 g of an H$_2$PtCl$_6$ solution containing 5.1*10$^{-2}$ moles of Pt per liter of solution were diluted in 400 ml of water and an opportune amount of a PVP solution containing 10 mg of PVP per ml of solution was added in order to achieve a Pt/PVP weight ratio equal to 1. After letting the solution stir at room temperature in air for 1 hour, NaBH$_4$ was added to the solution at room temperature. The amount of NaBH$_4$ was chosen in order to have a Pt/NaBH$_4$ weight ratio of ½. The resulting solution was stirred for 30 minutes and then 110 mg of K$_2$PdCl$_4$ were added to the solution. After 30 minutes, NaBH$_4$ was added to the solution at room temperature. The amount of NaBH$_4$ was chosen in order to have a Pd/NaBH$_4$ weight ratio of ½. Following stirring for 1 hour in air of the obtained mixture, an appropriate amount of alumina powder was added to the solution in order to achieve a total metal loading of 1% wt/wt and the pH adjusted to a value of 2.4 with an HCl solution containing 15% HCl in weight. After 30 minutes of stirring the solution was filtered and the solid powder recovered.

Example 5

The same process and quantities of reagents were used as in Example 4 with the exception that the order of addition of H$_2$PtCl$_6$ and of K$_2$PdCl$_4$ has been inverted.

Example 6

The same process and quantities of reagents were used as in Example 1 with the exception of the PVP addition. Here an opportune amount of PVP solution containing 10 mg of PVP per mg of solution was added in order to achieve a Pt/PVP weight ratio equal to 4.

Example 7

The same process and quantities of reagents were used as in Example 1 with the exception of the H$_2$PtCl$_6$ and support quantities which were chosen to obtain a catalyst having 2% wt/wt of precious metal with respect to the support.

Example 8

The same process and quantities of reagents were used as in Example 3 with the exception of the H$_2$PtCl$_6$, K$_2$PdCl$_4$ and alumina quantities which were chosen to obtain a catalyst having 4% wt/wt of precious metal with respect to the support.

Example 9

Comparative Example

Referring to FIG. 2, there is shown an XRD spectrum of a sample comprising 1% Pt wt/wt with respect to the support material deposited on an alumina support, prepared following the same process of Example 1, which was thermally aged for 12 hours at 800° C.

FIG. 3 shows an XRD spectrum of a sample comprising 1% Pt wt/wt with respect to the support material deposited on an alumina support, prepared from the same precious metal precursor according to state of the art incipient wetness impregnation methods, which was thermally aged for 12 hours at 800° C.

As one can see, in FIG. 2 the Pt diffraction peak is broader and less intense than in the case of the sample prepared according to state of the art incipient wetness impregnation, thus indicating a smaller average particle size.

Example 10

Comparative Example

Referring to FIG. 4, there is shown an XRD spectrum of a sample comprising 0.67% Pt wt/wt and 0.33% Pd wt/wt with respect to the support material deposited on an alumina support, prepared following the same process of Example 3, which was thermally aged for 12 hours at 800° C.

FIG. 5 shows an XRD spectrum of a sample comprising 0.67% Pt wt/wt and 0.33% Pd wt/wt with respect to the support material deposited on an alumina support, prepared from the same precious metal precursors according state of the art incipient wetness impregnation methods, which was thermally aged for 12 hours at 800° C.

As one can see, in FIG. 4 the Pt/Pd diffraction peak is broader and less intense than in the case of the sample prepared according to state of the art incipient wetness impregnation, thus indicating a smaller average particle size.

Example 11

Comparison of Examples and State of the Art—Examples

FIG. 6 shows the gas activity of the sample tested in a laboratory reactor simulating the exhaust emissions of a conventional diesel engine. The reaction conditions used were a fixed bed tube reactor where 40 mg of powder were diluted with 100 mg of cordierite material and the mixture was crushed and sieved in the range of 250-500 micrometer. The total gas flow rate was 200 mL/min and the resulting space velocity was equivalent to 15,000-20,000 per hour that would be experienced by a monolith sample. The gas composition used in the powder reactor testing comprised CO 2000 ppm, NO 100 ppm, $C_3H_8$ 300 ppm, $C_3H_8$ 300 ppm, toluene 350 ppm, $O_2$ 12%, $H_2O$ 5%. Unless otherwise specified, hydrocarbon (HC) concentrations are reported on a C1 basis.

At the beginning of the light-off test, the powder sample was equilibrated in the gas mixture for 20 minutes at 50° C. The temperature at which 50% conversion was observed is denoted as T50 and was used as the measure of catalyst activity: the lower the 150, the better the catalyst performance. The activity after thermal aging for 12 h at 800° C. of the samples prepared according to the process of the invention as outlined in Example 2, Example 3, Example 7 and Example 8, was compared to that of samples prepared according to state of the art impregnation incipient wetness methods (IW) from the same precious metal precursors, deposited on the same support material and having the same precious metal content as in Example 2, Example 3, Example 7 and Example 8.

As one can see, the catalytic activity of the samples prepared according to the process of invention is higher than that of the samples prepared according to state of the art impregnation methods as indicated by the lower T50 value of CO in the feed stream used for the evaluation.

What is claimed:

1. A catalyst composite comprising a catalyst on a substrate for purification of an exhaust gas of a combustion engine, the catalyst comprising:
   a precious metal component; and
   a support material for the precious metal component;
   wherein the precious metal component comprises colloidally-delivered nanoparticles on the support material that are dispersed upon aging;
   wherein the catalyst is effective as a diesel oxidation catalyst; and
   the substrate comprises a flow through substrate or a wall flow substrate.

2. The catalyst composite of claim 1, wherein the precious metal component comprises: platinum, palladium, rhodium, gold, silver, or mixtures thereof, and the support material comprises particles of aluminum oxide, silicon oxide, cerium oxide, zirconium oxide, titanium oxide, magnesium oxide alone or as mixtures thereof or solid solutions thereof.

3. The catalyst composite of claim 1, wherein the precious metal component comprises colloidally- and protective agent-delivered nanoparticles.

4. The catalyst composite of claim 3, wherein the colloidally- and protective agent-delivered nanoparticles are deposited onto the support material in an aqueous mixture by reduction and pH adjustment of a mixture of a protecting agent and a precursor of the metal component.

5. The catalyst composite of claim 3, wherein a protecting agent is selected from a group consisting of soluble homo- and co-polymers having one or more amino, amido, carboxylic, aldehydic, or hydroxyl groups, and organic molecules having one or more amino, amido, carboxylic, aldehydic, or hydroxyl groups and mixtures thereof.

6. The catalyst composite of claim 1 comprising platinum and palladium as the precious metal component, wherein after treatment of the catalyst at 800° C. for 12 h in an oxidizing atmosphere (10% $H_2O$ in air), no less than 36% of particles of the precious metal component have an average diameter below 22 nm.

7. The catalyst composite of claim 1, the precious metal component comprising platinum and palladium, wherein after treatment of the catalyst at 800° C. for 12 h in an oxidizing atmosphere (10% $H_2O$ in air), no less than 90% of precious metal particles are constituted by both Pt and Pd.

8. The catalyst composite of claim 1, the precious metal component comprising platinum and palladium in a substantially equal molar ratio, wherein after treatment of the catalyst at 800° C. for 12 h in an oxidizing atmosphere (10% $H_2O$ in air), no less than 78% of precious metal particles are constituted by a molar ratio of Pt:Pd in the range of 0.8 to 1.2.

9. The catalyst composite of claim 1, the precious metal component comprising platinum and palladium in a substantially equal molar ratio, wherein after treatment of the catalyst at 800° C. for 12 h in an oxidizing atmosphere (10% $H_2O$ in air), no less than 63% of precious metal particles are constituted by a molar ratio of Pt:Pd in the range of 0.9 to 1.1.

10. The catalyst composite of claim 1, prepared by a process comprising the steps of:
    (1) adding a protecting agent to an aqueous solution of a metal precursor to give a mixture (M1),
    (2) adding a reducing agent to mixture (M1) to give a mixture (M2), the reducing agent being selected from the group consisting of alkali metal borohydrides and alkali metal citrates,
    (3) adding a support material to mixture (M2) to give a mixture (M3) where the support material is suspended in a liquid phase,
    (4) adjusting the pH of mixture (M3) to form the catalyst comprising metal particles on the support material, the catalyst being suspended in the liquid phase,
    (5) separating the catalyst and the liquid phase of mixture (M3),
    (6) depositing the catalyst on a substrate;
    wherein the catalyst is effective as a diesel oxidation catalyst.

11. The catalyst composite of claim 10, wherein the protecting agent is selected from a group consisting of soluble homo- and co-polymers having one or more amino, amido, carboxylic, aldehydic, or hydroxyl groups, and organic molecules having one or more amino, amido, carboxylic, aldehydic, or hydroxyl groups, and mixtures thereof.

12. The catalyst composite of claim 10, wherein the metal precursor is selected from a group consisting of metal salt of platinum, palladium, rhodium, gold, silver, and mixtures thereof.

13. The catalyst composite of claim 10, wherein the support material is selected from a group consisting of aluminum oxide, silicon oxide, cerium oxide, zirconium oxide, titanium oxide, magnesium oxide alone or as mixtures thereof, and solid solutions thereof.

14. The catalyst composite of claim 10, wherein in step (5) the catalyst and liquid phase of mixture (M3) are separated by filtration or evaporation of the solvent.

15. The catalyst composite of claim 10 comprising platinum and palladium as metals, wherein after treatment of the catalyst at 800° C. for 12 h in an oxidizing atmosphere (10% $H_2O$ in air), no less than 36% of the metal particles have an average diameter below 22 nm.

16. The catalyst composite of claim 10 comprising platinum and palladium as metals, wherein after treatment of the catalyst at 800° C. for 12 h in an oxidizing atmosphere (10% H₂O in air), no less than 90% of the metal particles are constituted by both Pt and Pd.

17. A process for oxidizing diesel exhaust wherein the diesel exhaust is brought into contact with a catalyst composite according to claim 10.

18. A catalyst for purification of an exhaust gas of a combustion engine, the catalyst comprising:
   a precious metal component comprising: platinum, palladium, or a mixture thereof;
   a support material for the precious metal component comprising particles of aluminum oxide;
   wherein after treatment of the catalyst at 800° C. for 12 h in an oxidizing atmosphere (10% H₂O in air), no less than 36% of particles of the precious metal component have an average diameter below 22 nm; and
   wherein the catalyst is effective as a diesel oxidation catalyst.

19. The catalyst of claim 18, wherein the precious metal component comprises colloidally- and protective agent-delivered nanoparticles that are deposited onto the support material in an aqueous mixture by reduction and pH adjustment of a mixture of a protecting agent and a precursor of the metal component, wherein a reducing agent comprises an alkali metal borohydride, and the protective agent comprises poly(vinylalcohol), poly(vinylpyrrolidone), poly(ethyleneimine), poly(acrylic acid), carbohydrates or alkali metal citrates.

20. The catalyst of claim 18, wherein platinum and palladium are in a substantially equal molar ratio and wherein after treatment of the catalyst at 800° C. for 12 h in an oxidizing atmosphere (10% H₂O in air), no less than 78% of precious metal particles are constituted by a molar ratio of Pt:Pd in the range of 0.8 to 1.2.

* * * * *